(No Model.)

G. WALZEL.
PNEUMATIC CUSHION TIRE.

No. 581,567. Patented Apr. 27, 1897.

WITNESSES:
T. H. Wilcox
E. Latham

INVENTOR
GREGOR WALZEL
BY Oscar A. Michel & Co
ATTORNEYS.

THE NORRIS PETERS CO., PHOTO-LITHO., WASHINGTON, D. C.

UNITED STATES PATENT OFFICE.

GREGOR WALZEL, OF NEW YORK, N. Y.

PNEUMATIC CUSHION-TIRE.

SPECIFICATION forming part of Letters Patent No. 581,567, dated April 27, 1897.

Application filed September 19, 1894. Serial No. 523,495. (No model.)

*To all whom it may concern:*

Be it known that I, GREGOR WALZEL, a citizen of the United States, residing at New York, in the county of New York and State of New York, have invented certain new and useful Improvements in Pneumatic Cushion-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to improvements in that class of tires which are used for bicycle or carriage wheels and such other wheels as have the calling for an encircling band or hoop possessed of a certain softness and elasticity.

The object of my improvement is to provide a simple and efficient inflatable wheel-tire with a supplemental solid tire inserted into the inflated tire, and in the construction and arrangements of the various parts whereby the said supplemental solid tire is firmly yet elastically held in the inflated tire.

It consists, further, in the novel arrangement and combination of parts hereinafter described and claimed.

My invention will be more fully understood when taken in connection with the accompanying sheet of drawings, forming part hereof.

Figure 1:
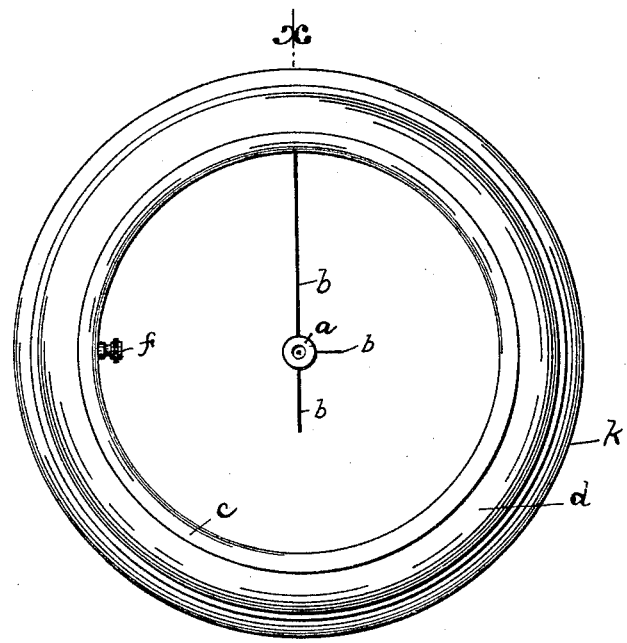
Figure 2:
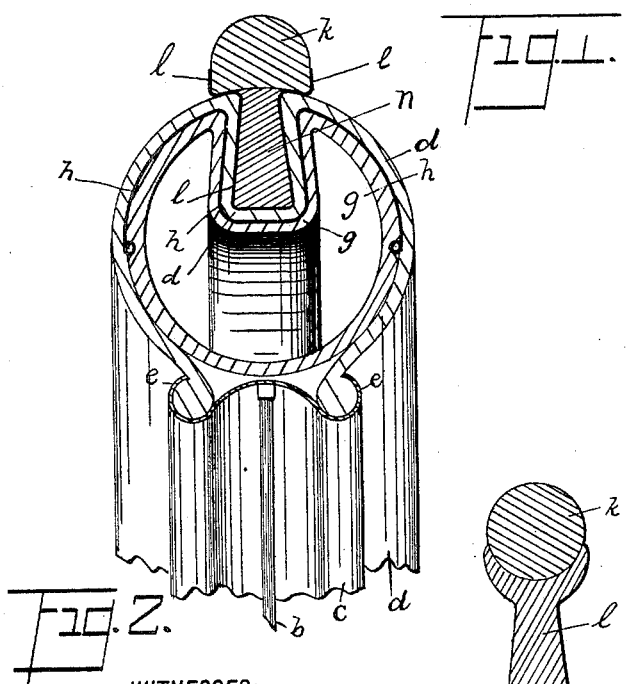
Figure 3:
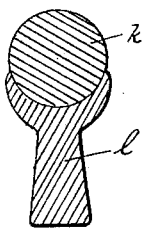

Figure 1 is a side elevation of my improved wheel having nearly all the spokes removed and showing the valve for inserting the air to inflate the tire. Fig. 2 is an enlarged section on line $x$ of Fig. 1. Fig. 3 is a modified construction showing a different construction of my improved tire without departing from the spirit of my said invention.

In said drawings, $a$ represents the hub, and $b$ the spokes, of the wheel, which are both by preference of metal, although it is obvious that wood or any other appropriate material may be used, the rim or felly $c$ being so turned or sprung up as to receive the ends of the outer rubber tire $d$, which will bind and remain in said turned edge $e$ when the air is inserted through the valve $f$, as shown in Fig. 1. Between the outer rubber tire $d$ and the inner tube $g$ is placed a rim of steel or sheet metal $h$, the ends of which are partly inserted in the inner tube $g$, this extra rim $h$ being so arranged that the rider will not be bothered with puncturing his inner tube $g$, which contains the air, when riding over sharp obstruction in the road, and also will serve, when sprung up, as indicated in Fig. 2, to hold the supplemental solid tire $k$.

As will be seen more fully upon referring to Fig. 2 of the drawings, the inner tube $g$, extra steel rim $h$, and the outer tube $d$ are circular wedge ⌒-shaped, so as to receive the frame $l$, which contains the supplemental solid tire, and hold the same in place. The object of this supplemental solid tire, as will be understood, is to reduce the lost friction which is found in pneumatic tires now on the market, as the weight of the rider bearing on the wheel making the contact-point with the road flat, and thereby reducing the speed of the rider, while with my supplemental solid tire the contact-point will remain always round and still have the effect of a pneumatic tire by having the supplemental tire inserted in the inflated tire. In Fig. 2 I show that this supplemental solid tire $k$ may be made of two pieces $k$ and $n$ and have a steel rim or any other appropriate material to hold the same in a fixed position, while in Fig. 3 is shown a modification where the rim $l$ is made out of wood or any other appropriate material and having the supplemental solid tire $k$ perfectly round and cemented or otherwise secured to the said rim $l$.

I do not intend to limit myself to the precise construction of the various details of my invention, as modifications thereof may be made without departing from the spirit of my invention.

What I claim as new, and desire to secure by Letters Patent of the United States, is—

1. In a wheel, the inner tube, the outer inclosing tube, and the rim $h$, interposed between the two, combined with a supplemental solid tire which consists of the outer projecting portion $k$, and the inwardly-projecting part $n$; the inner and outer tubes being provided with recesses which correspond to the part $n$ of the solid tire, and the two tubes and the rim $h$, being sprung up to receive the solid tire, substantially as shown.

2. In a wheel, the combination with a pneumatic tire secured to the rim of said wheel, a supplemental solid tire having a circular ⌒-shaped shank to enter the corresponding circular ⌒-shaped opening in said pneumatic tire, said shank having ends flaring outward to receive said supplemental solid tire and resting upon the circumference of said pneumatic tire as and for the purposes set forth.

3. In a wheel, the combination with a pneumatic tire secured to the rim of said wheel, a rim $h$ interposed between the outer tube $d$ and inner tube $g$, said tube $d$, rim $h$ and inner tube $g$ having a circular ⌒-shaped opening to receive the circular ⌒-shaped shank containing the supplemental solid tire, said supplemental solid tire resting on the circumference of the pneumatic tire as shown and described.

4. In a wheel, the combination with a pneumatic tire secured to the rim of said wheel, a rim $h$ interposed between the outer tube $d$ and inner tube $g$, said outer tube, $d$, rim $h$ and inner tube $g$ being sprung up to receive the frame $l$ containing the supplemental solid tire $k$, substantially as set forth.

In testimony that I claim the invention set forth above I have hereunto set my hand this 13th day of September, 1894.

GREGOR WALZEL.

Witnesses:
 OSCAR A. MICHEL,
 AUGUST GROSS.